United States Patent
Dudt et al.

(10) Patent No.: US 7,163,138 B1
(45) Date of Patent: Jan. 16, 2007

(54) FRICTION STIRRED INTRODUCTION OF PARTICLES INTO A METALLIC SUBSTRATE FOR SURFACE DURABILITY TREATMENT

(75) Inventors: Philip John Dudt, Rockville, MD (US); David R. Forrest, Gaithersburg, MD (US); Jennifer P. Nguyen, Sterling, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/126,510

(22) Filed: May 9, 2005

(51) Int. Cl.
*B23K 20/12* (2006.01)
*B23K 31/02* (2006.01)

(52) U.S. Cl. .................................................. 228/112.1
(58) Field of Classification Search ............. 228/112.1, 228/2.1
See application file for complete search history.

(56) References Cited

U.S. PATENT DOCUMENTS

| | | | |
|---|---|---|---|
| 4,959,241 A * | 9/1990 | Thomas et al. ................ | 427/11 |
| 6,543,671 B1 * | 4/2003 | Hatten et al. ............. | 228/112.1 |
| 6,634,199 B1 | 10/2003 | Nomura et al. | |
| 6,726,085 B1 | 4/2004 | Litwinski et al. | |
| 6,905,060 B1 * | 6/2005 | Van Aken et al. ........ | 228/112.1 |
| 2004/0265503 A1 * | 12/2004 | Clayton et al. ............. | 427/446 |
| 2005/0045695 A1 * | 3/2005 | Subramanian et al. ... | 228/112.1 |
| 2005/0242158 A1 * | 11/2005 | Bolser ...................... | 228/112.1 |

\* cited by examiner

*Primary Examiner*—Lynne R. Edmondson
(74) *Attorney, Agent, or Firm*—Jacob Shuster; Dave A. Ghatt

(57) ABSTRACT

An axially elongated cylindrical tool has a protrusion at a lower end thereof which is inserted into a metallic work piece substrate under pressure during rotation of the tool and displacement thereof in one direction. Mixing of a matrix of metal and particles by the protrusion occurs within a stir zone underlying the substrate surface which is thereby treated by dispersion of the particles therein in response to rotation of the tool. Influx of the hard particles into the work piece substrate is effected during said mixing by the rotating tool.

6 Claims, 2 Drawing Sheets

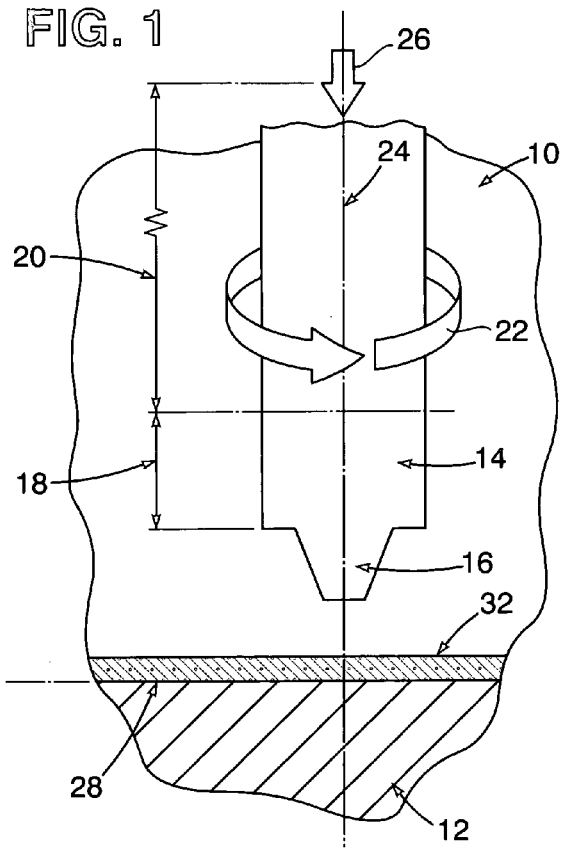
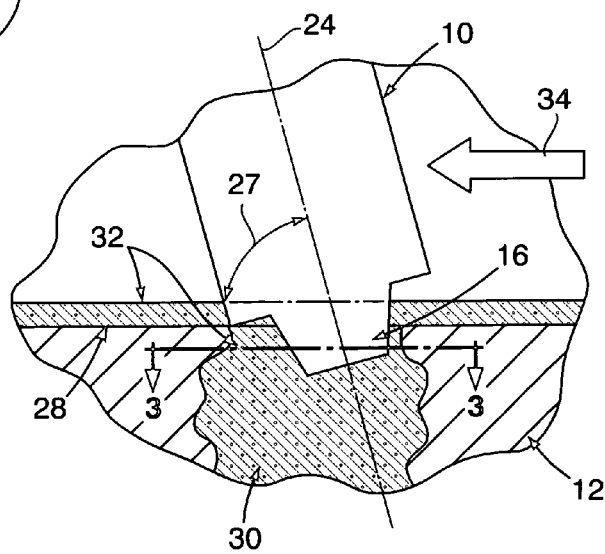
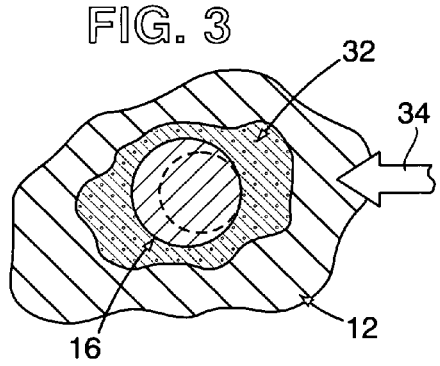

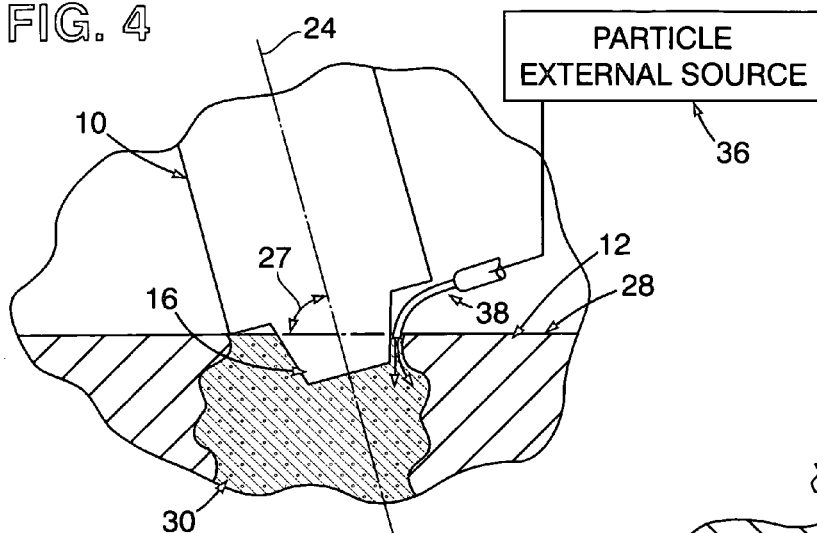
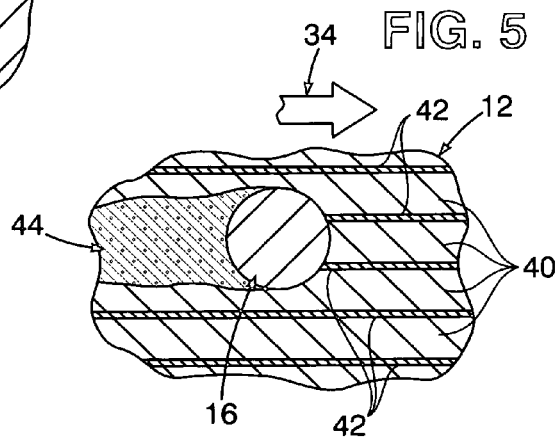
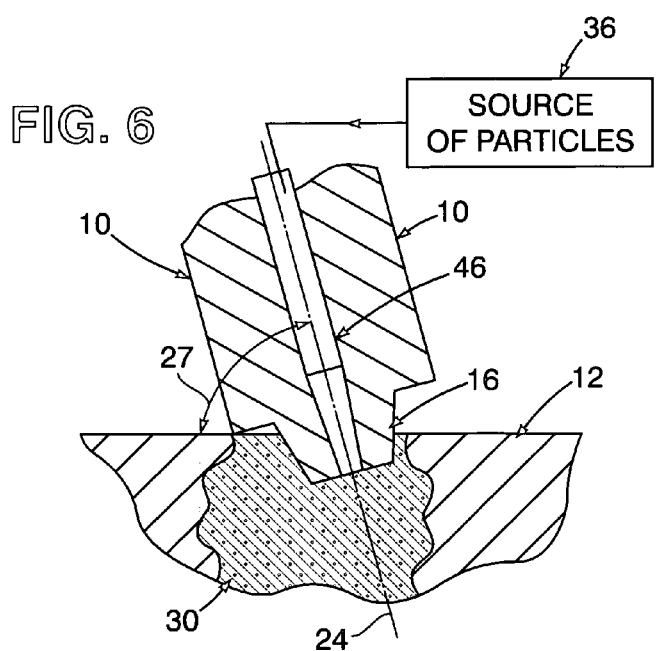

FRICTION STIRRED INTRODUCTION OF PARTICLES INTO A METALLIC SUBSTRATE FOR SURFACE DURABILITY TREATMENT

The present invention relates generally to the production of a metal work piece with improved surface durability.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Work piece components are often subject to wear and abrasion during use or operation in a variety of environments. Currently various methods are provided for improving surface wear durability by nitriding, carburizing, quenching, surface coating, cladding and centrifugal casting with hard carbides injected into the melt. Such methods are limited by reaction kinetics, diffusion kinetics, formation of undesirable phase, inhomogeneity due to concentration gradients and thermodynamic stability of the phases of interest at high treatment temperatures. Workpiece distortion is a typical consequence of the aforesaid high treatment temperatures. It is therefore an important object of the present invention to provide for surface treatment of work piece components which avoids the problems and disadvantages heretofore associated therewith.

SUMMARY OF THE INVENTION

Pursuant to the present invention, the durability of the surface of a metallic work piece substrate, subject to wear and corrosion, is improved by influx of hard particles into the substrate within which dispersion of the particles is effected by rotation of a friction stir welding type tool under axial pressure having a protrusion inserted into the substrate to effect mixing. Various different methods may be utilized for influx of the hard particles. The hard particles may be transferred from a layer deposited onto the substrate surface or may be injected from some external source. The hard particles could also be derived and delivered by ablation of the friction stir tool during use. A layer of the hard particles may be laminated with layers of base metal before being mixed by the tool to transfer the particles into the surfaces. Finally the hard particles may be injected from an external source through a central hole in the tool extending along its axis.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 1 is a partial side view of a friction-stir welding tool positioned over a portion of a metallic substrate undergoing surface durability treatment pursuant to one embodiment of the present invention;

FIG. 2 is a partial side view of the friction stir tool shown in FIG. 1, projected into the metallic substrate during performance of the surface durability treatment;

FIG. 3 is a partial section view taken substantially through a plane indicated by section line 3—3 in FIG. 2;

FIG. 4 is a partial side view corresponding to that of FIG. 2, showing performance of the surface durability treatment pursuant to another embodiment of the present invention;

FIG. 5 is a partial section view corresponding to that of FIG. 3 showing yet another embodiment of the present invention; and FIG. 6 is a partial section view showing yet another embodiment of the present invention.

DETAILED DESCRIPTION OF PREFERRED EMBODIMENT

Referring now to the drawing in detail, FIG. 1 illustrates a friction-stir welding tool 10 positioned in spaced relation above a metal substrate work piece component 12 to be surface treated pursuant to one embodiment of the present invention. The tool 10 has an axially elongated cylindrical body 14 with a lower axial end from which a downwardly convergent protrusion 16 extends. A lower axial end section 18 of the tool body 14, as diagrammed in FIG. 1, is constructed of a material such as ceramics or layered steel that is softer and more easily ablated than an upper section 20 made of harder and ablation resistant layered steel material. The tool 10 undergoes rotation 22, as diagrammed in FIG. 1, about its axis 24 while axial pressure 26 is being applied thereto just before the tool protrusion 16 is inserted into a surface 28 of the metal substrate 12 as shown in FIG. 2. A metal matrix with hard particles therein is deposited as a layer 32 onto the surface 28 from which the hard particles enters into a stir zone 30 established within the work piece 12 as shown in FIGS. 2 and 3. Stirring of such matrix is effected below the melting temperature of the work piece 12 by the aforesaid rotation 22 of the tool 10 under the axial pressure 26 so to mix the metal matrix with the hard particles received from the layer 32 together with any residual alloys in the layer 32.

The hard particles within the deposited layer 32 is composed of a chemically selected material which will substantially improve properties of the metallic surface 28, such as wear resistance, heat resistance and corrosion resistance, as a result of the aforesaid stir mixing within the zone 30. The stirring tool 10 undergoes shift in a feed direction 34 as denoted in FIG. 2 so as to apply surface treatment along the entire surface 28 on the metal substrate component 12 to thereby render it more durable by enhanced resistance to wear, heat and corrosion.

According to another embodiment of the present invention as diagrammed in FIG. 4, the hard particles are introduced from an external source 36 through an injector 38 into the stir zone 30 within the metal substrate 12 for dispersion therein by rotation of the tool 10 with its axis 24 at an inclination angle 27. Surface deposit of such hard particles from the surface layer 32 is thereby avoided.

The construction of the stirring tool 10 as hereinbefore described insures adequate performance of the surface treatment process by adequate dispersion of the hard particles introduced into the metal substrate component 12 either by transfer from the deposited layer 32 or injection from the external source 36 wherein the disintegration of the particles occurs with or without ablation and erosion. Only after such dispersion has occurred, so as to effect an increase in durability and an improvement in other physical properties of the metal substrate surface 28, the tool 14 may be replaced.

Referring now to FIG. 5, yet another embodiment of the present invention involves initial preparation of the work piece component 12 into alternating layers 40 of base metal sheets and layers 42 of dispersed particles that are loosely or weakly consolidated with a binder. The layers 40 and 42 are intermixed by rotation of the stir tool protrusion 16, resulting in a dispersion 44 of the hard particles within the metal work piece component 12. The degree of such mixing by the protrusion 16 may be controlled by providing threads or surface steps along the tapered outer surface of the protrusion 16. Also the layers 40 and 42 may be stacked 90° from the orientation thereof shown in FIG. 5.

FIG. 6 illustrates yet another embodiment of the present invention, wherein influx of the hard particles from the external source 36 is effected during rotation of the tool 10 through a hole 46 formed therein. The hard particles accordingly emerge from the hole 46 at the lower end of the protrusion 16 into the stir zone 30.

Obviously, other modifications and variations of the present invention may be possible in light of the foregoing teachings. It is therefore to be understood that within the scope of the appended claims the invention may be practiced otherwise than as specifically described.

What is claimed is:

1. A method of preparing a surface treated work piece substrate by use of a rotating stir tool having a protrusion, comprising: forming the work piece substrate with a plurality of layers of sheet metal and a plurality of layers of hard particles dispersed in a binder, the layers of sheet metal and the layers of hard particles being arranged in an alternating configuration, the alternating configuration having a layer of hard particles formed on each side of at least one of the layers of sheet metal; and mixing said layers by rotation of the protrusion pressed into the substrate under pressure during displacement thereof in one direction through the substrate.

2. The method as defined in claim 1, wherein said hard particles are formed from material which chemically resists surface wear, corrosion and erosion.

3. The method as defined in claim 1, wherein said dispersion of the hard particles by said rotation of the tool is effected by positioning the tool at an inclination angle to the surface of the substrate.

4. The method as defined in claim 1, wherein the alternating configuration is formed with at least three layers of sheet metal.

5. The method as defined in claim 1, wherein the substrate is positioned such that each layer of hard particles and each layer of sheet metal is located in the same horizontal plane, and mixing said layers further comprises pressing the protrusion into the substrate from a position above the substrate.

6. The method as defined in claim 1, wherein the substrate is positioned such that each layer of hard particles and each layer of sheet metal is located in a different horizontal plane, and mixing said layers comprises pressing the protrusion into the substrate from a position above the substrate.

* * * * *